United States Patent [19]
Mueller

[11] Patent Number: 6,044,886
[45] Date of Patent: Apr. 4, 2000

[54] STACKABLE CONES METHOD AND APPARATUS THEREFOR

[76] Inventor: Martin Mueller, 4929 E. Lake Shore Dr., Wonder Lake, Ill. 60097

[21] Appl. No.: 09/001,396

[22] Filed: Dec. 31, 1997

[51] Int. Cl.[7] .............................. B31F 1/20; B65B 61/22; A23P 1/08

[52] U.S. Cl. .............................. 156/443; 53/142; 53/157; 53/176; 53/221; 53/397; 53/445; 53/447; 53/540; 53/585; 156/354; 156/355; 426/75

[58] Field of Search ..................................... 156/443, 354, 156/355; 53/397, 142, 157, 445, 447, 585, 176, 221, 540; 426/75

[56] References Cited

U.S. PATENT DOCUMENTS

| | | | |
|---|---|---|---|
| 5,379,569 | 1/1995 | Mueller | 53/397 |
| 5,611,192 | 3/1997 | Weder | 53/221 |
| 5,873,222 | 2/1999 | Mueller | 53/585 |

*Primary Examiner*—Deborah Jones
*Assistant Examiner*—Robert R. Koehler
*Attorney, Agent, or Firm*—Mathew R. P. Perrone, Jr.

[57] ABSTRACT

Each individual cone is conveyed, while it is laying on its side, to a predetermined point. Prior to reaching the predetermined point, an edible adhesive is at or adjacent to the base of each cone. At the predetermined point, a paper wrap is applied to the cone and adhered thereto. The first cone is then stacked with a second cone in a repeated fashion to form a sleeve of cones, followed by packing of the sleeve of cones for transport.

19 Claims, 6 Drawing Sheets

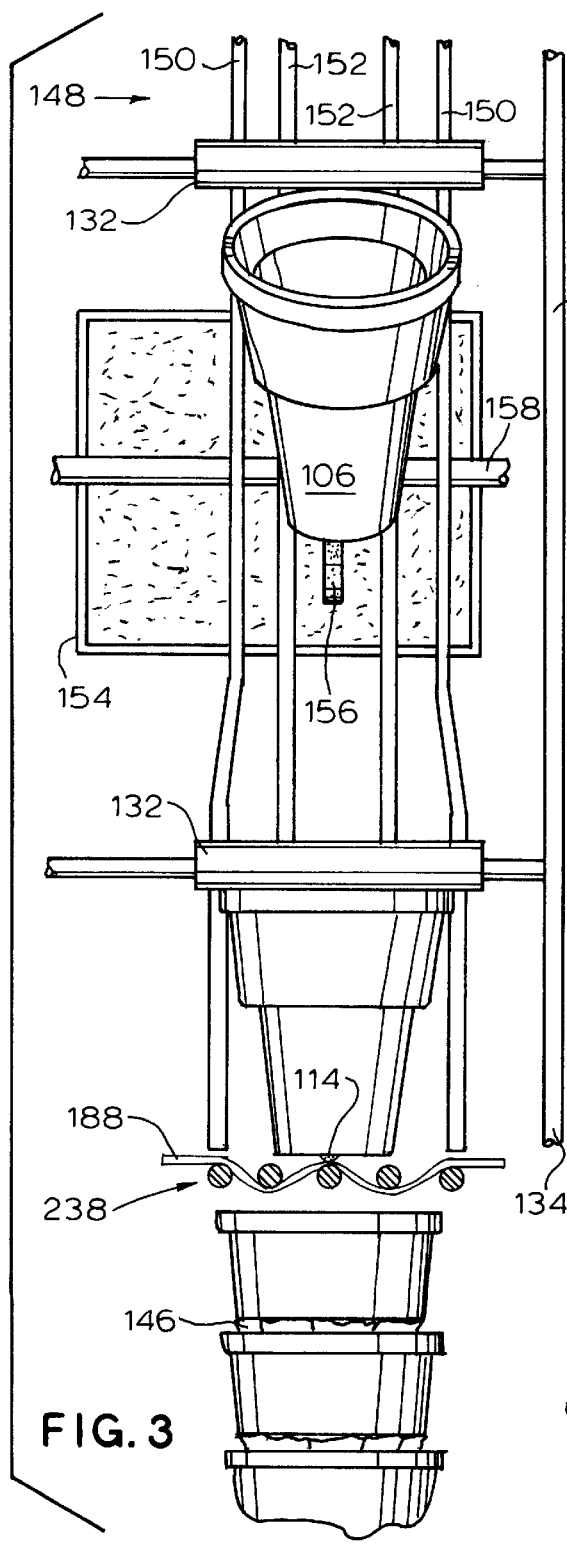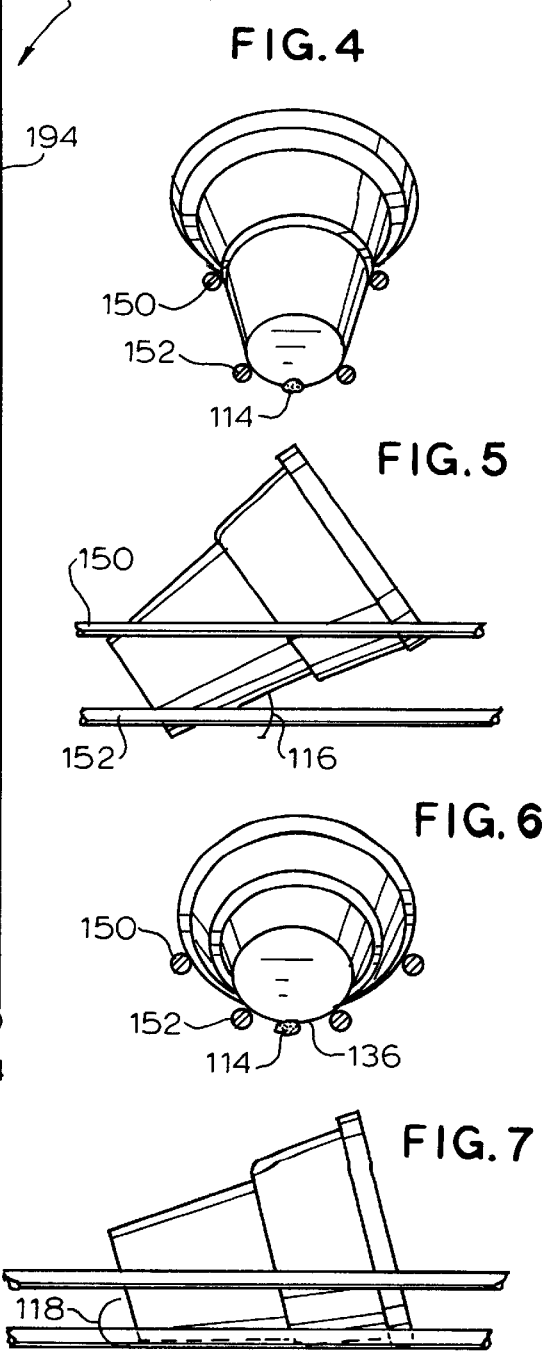

STACKABLE CONES METHOD AND APPARATUS THEREFOR

This invention relates to a method and apparatus for protecting an ice cream cone and similar food items; and more particularly to set of stackable cones, a method and apparatus for forming a stack of cones, while applying a protective device to each ice cream cone of any desired shape and similar food items so that only the final consumer of the ice cream cone touches the actual cone.

BACKGROUND OF THE INVENTION

With the awareness of the public regarding contaminated foods, the requirements for sanitation are greater than ever before. The requirements for sanitation these days are so extreme, that there is a even a substantial amount of interference with the enjoyment of the ever popular ice cream cone.

Customarily, edible containers known as cones are manufactured, nested or stacked one within another, packaged, and shipped to an end user. Each cone is removed from the package one at a time, is filled with ice cream or a similar food, and is sold by the end users to a consumer. Customarily, there is no cover on each cone as it is removed from the package. So a cone, first removed from the package, can come into direct skin contact with someone other than the end consumer.

Since the development of the ice cream cone at the St. Louis World's Fair about one hundred years ago, an ice cream cone is known to produce great enjoyment. An ice cream store can have many varieties of ice cream and hand pack the desired flavor into the desired cone. It is difficult to accomplish this function under the extreme sanitary conditions of today.

These and other factors are thoroughly discussed in U.S. Pat. 5,379,569; incorporated herein by reference. The referenced patent and this application have the same inventive entity.

Typical cone shapes for receiving ice cream are those pointed cones, which have a geometric cone shape and taper to a point at one end, and those flat based cones, which have a flat base in order to permit the cone to stand upright unsupported on a flat surface and contain ice cream or other food therein. Both the flat based cones and the pointed cones need protection. The cited patent shows an efficient paper protection application to a flat based cone, only to the base of the flat based cone.

If such a procedure can applied to both types of cones, great advantages are achieved. Such advantages are further increased if the same machine can treat the pointed cone and the flat-based cone, especially with little or no modification.

Typically, cones are shipped in a stacked relation. Unfortunately, such stacking can result in one cone adhering to an adjacent cone. Such adherence greatly interferes with the dispensing of the cone. If stacking efficiency can be maintained, while avoiding the adherence, great advantages can be obtained.

However, sanitation and cleanliness are even more important in the food industry. It is difficult to avoid direct skin to food contact in an ice cream cone. With the widespread fear of infectious disease, the enjoyment of an ice cream cone can be substantially reduced.

Furthermore, a cone containing ice cream is known to leak. When a cone leaks, at least the person's hands become soiled or sticky. Such stickiness is uncomfortable at best and damaging to a person's clothes at worst.

Also, it is advisable to have a cleaning device available for solving this problem. If the cone can be protected while at the same time providing this cleaning device, a great advantage is obtained.

SUMMARY OF THE INVENTION

Among the many objectives of this invention is the provision of an edible cone capable of containing ice cream or similar food with a protective covering removably adhered to the side of a cone.

A further objective of this invention is to provide a flat based, edible cone having a protective cover adhered thereto.

A still further objective of this invention is to provide a pointed cone with a removable protective cover adhered thereto.

Yet a further objective of this invention is to provide an nestable or stackable edible cone with a protective cover.

Also an objective of this invention is to provide a method for placing a protective cover on a cone.

Another objective of this invention is to provide a method removably applying a protective cover to an edible cone.

Yet another objective of this invention is to provide a method for stacking a plurality of covered cones.

Still another objective of this invention is to provide a method for forming a cover for a cone.

A further objective of this invention is to provide an edible cone stackable having a protective cover adhered thereto, while avoid one cone adhering to an adjacent cone.

These and other objectives of the invention (which other objectives become clear by consideration of the specification, claims and drawings as a whole) are met by providing an apparatus for conveying cones lying on the side to a predetermined point. Prior to reaching the predetermined point, an edible adhesive is applied at or adjacent to the base of each cone. At the predetermined point, a paper wrap is applied to the cone and adhered thereto. The first cone is then stacked with a second cone in a repeated fashion to form a sleeve of cones, followed by packing of the sleeve of cones for transport. The first cone is substantially identical to the second cone.

BRIEF DESCRIPTION OF THE DRAWINGS

FIG. 3 depicts a top plan view of the cone stacking apparatus 100 of this invention used with a series of the flat based cone 106.

FIG. 4 depicts a bottom perspective view of the flat based cone 106 having adhesive spot or edible glue 114 applied thereto.

FIG. 5 depicts a side view of FIG. 4 showing the flat based cone 106 supported at adhesive angle 116.

FIG. 6 depicts a bottom perspective view of the flat based cone 106 supported at paper angle 118.

FIG. 7 depicts a side view of FIG. 6 showing the flat based cone 106 supported at paper angle 118.

Throughout the figures of the drawings, where the same part appears in more than one figure of the drawings, the same number is applied thereto.

DESCRIPTION OF THE PREFERRED EMBODIMENTS

Figure 1:
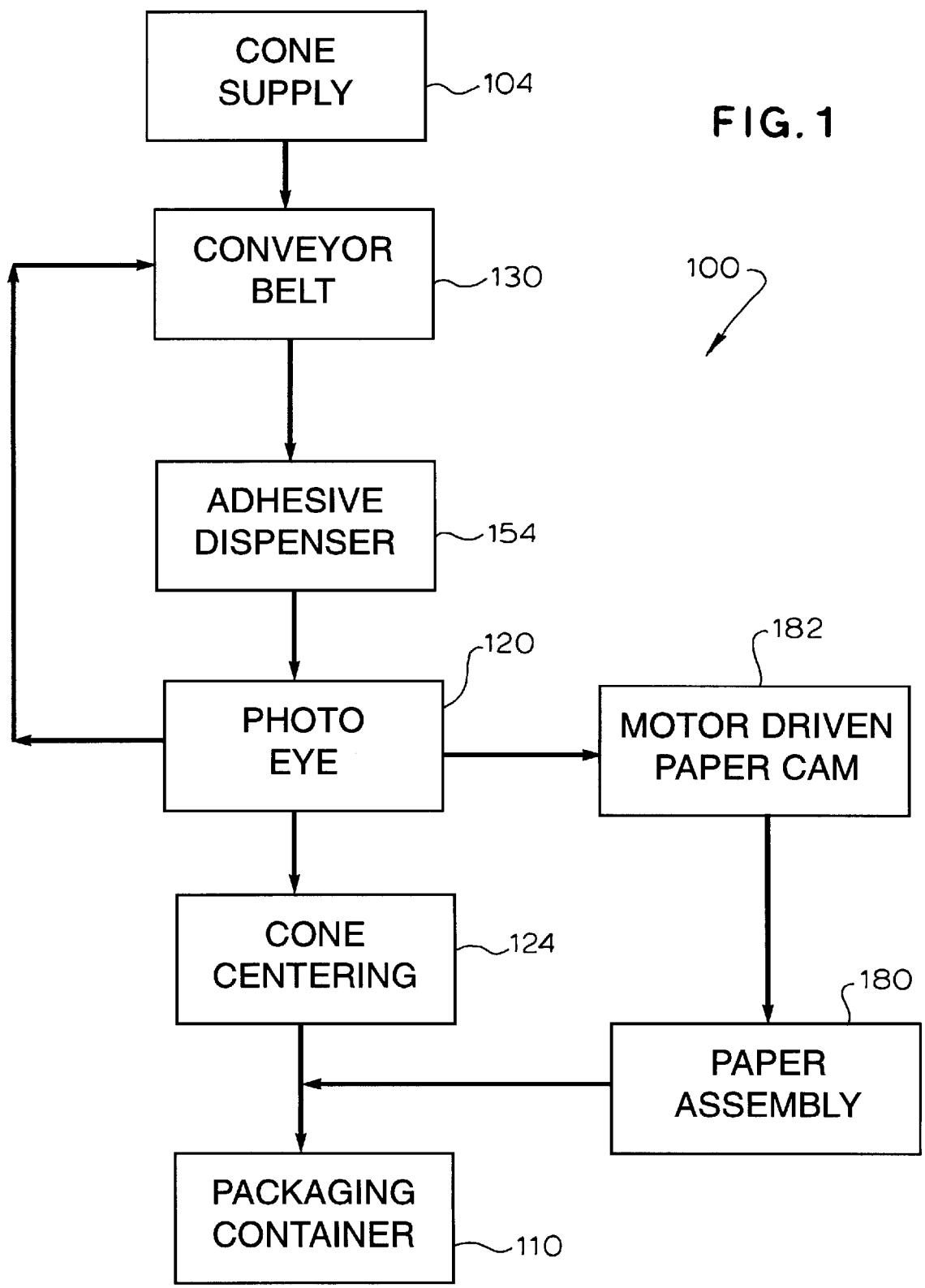
FIG. 1 is a block diagram depiction of the cone stacking apparatus 100 of this invention.

Each cone in a stack of cones has a thin paper sheet or paper wrap covering the base thereof and adhered thereto by a spot of adhesive. The location of the spot of adhesive combined with the thin paper applied to the base permits the cones to be stacked, while avoiding the adherence of one cone to an adjacent cone, that is a first cone to a second cone. For a flat based cone, the adhesive is applied at or adjacent to the base corner of the cone. For a pointed cone, the adhesive is applied at or adjacent to the point.

Each cone in a stack is substantially identical to a second and succeeding cones in the stack. By substantially identical is meant that each cone in a stack does appear similar to all other cones in the stack upon a visual examination, but is not perfectly similar on microscopic examination.

The apparatus for forming a stack of cones with a paper cover on each cone includes a cone feeding device. This cone feeding device causes each of the cones to contact an adhesive applicator. After adhesive application, each cone is fed to a paper supply. A paper wrap from the paper supply covers each cone, with the help of the adhesive.

The paper wrap for each cone from the paper supply is provided by a paper supply assembly. The paper supply assembly includes a roll assembly, a corrugating assembly, and a cutting assembly. In the paper supply assembly, paper feeds from the roll assembly to the corrugating assembly, which creases the paper. The creased paper is fed to a wrapping assembly, which cuts a sheet of paper or forms the paper wrap from the paper roll, and feeds the paper wrap to position adjacent to a cone.

As the paper wrap is positioned, the cone contacts a centering device, which positions the cone for wrapping. After the cone is centered, the stacking and packaging takes place. During the stacking and the packaging, the sheet of paper wraps around the cone. The wrapped cones are then packaged for shipping.

The paper supply is drawn from a large supply roll of the roll assembly, then passed over a series of direction reversing rollers and provided to a base portion of the cone. As the paper is provided substantially perpendicularly to the horizontal axis of the cone, the paper received between a series of corrugating bars, to corrugate or create parallel waves in the paper.

The series of corrugating bars corrugates the paper at or before it contacts the cone. This corrugation makes for efficient attachment of the paper to the cone and folding of the paper around the cone. Such folding of the paper and attaching to the cone at the adhesive spot is greatly facilitated by the corrugations.

The corrugating bars are preferably five in number. These bars have a coplanar end and an offset end. At the coplanar end, the bars occupy a first common same plane. At the offset end, the two outer bars and the center bar occupy a second common plane. Also at the offset end first interior bar, which is between the first outer bar and center bar; and the second interior bar, which is between the second outer bar and center bar a third common plane. The second common plane and the third common plane, preferably one-dimensional arcuate planes, in order to efficiently assist in the corrugating of the paper.

A paper sheet of sufficient size to cover the base of the cone is cut from the roll before or preferably after corrugation. The adhesive adheres the paper to the cone and the desired results are obtained. This particular structure minimizes or eliminates the adhering together of the cones in the packaging.

This particular assembly permits the use of very thin paper. Preferably, the paper has a thickness of up to about 0.023 millimeter (0.0009 inch). More preferably, the paper has a thickness of about 0.008 millimeter (0.0003 inch) to about 0.020 millimeter (0.0008 inch). Most preferably, the paper has a thickness of about 0.010 millimeter (0.0004 inch) to about 0.015 millimeter (0.0006 inch).

This paper is reticulated from a paper roll over a series of rollers and provided vertically to the base of the cone. The paper is received between a series of bars which corrugates the paper as it contacts the cone which makes for efficient attachment of the paper to the cone.

A paper sheet of sufficient size to cover the base of the cone is cut from the roll after corrugation of that portion of the sheet. The adhesive adheres the paper to the cone and the desired results are obtained. This particular structure minimizes the adhering together of the cones in the packaging.

For a flat based cone, the cone feeding device includes a supported chute. The supported chute preferably provides at least a partial gravity feed for the cone. A suction cup or similar device may assist the removal of each cone from the chute, which in turn leads the to a rail system.

The rail system permits the flat based cones to angle in a downward fashion at the base. This downward slope permits the adhesive to be applied to the cone at or adjacent to the base. The downward slope permits a point near the base of the cone to be contacted by an adhesive applicator.

Changes in the flat based cone angle are cause by two pairs of rails. The upper pair of rails guides the cone along. The lower pair of rails supports each flat base cone and angles the cone downwardly toward the adhesive. The upper pair of rails widens after the application of the adhesive, which brings the symmetrical axis of the cone substantially perpendicular to the paper.

As the flat based cone approaches the paper, it contacts a centering mechanism. In this manner, the cone is guided properly into the paper. The adhesive, the corrugation and the centering device combine to efficiently position the cone on or about the center of the paper and wrap the same.

If the cone is a flat base cone, the application of the adhesive preferably occurs right on the edge of the base. If the cone is a pointed cone, the application of the adhesive preferably occurs adjacent to the tip. For the flat based cone, a rail system angles the cone downwardly to permit efficient contact of the cone with the adhesive.

If a pointed cone is to be covered with paper, the rails are replaced by a chute. The chute supports the pointed cone downwardly so that the adhesive applicator contacts the cone at or adjacent to the pointed tip. This contact through a slot in the chute applies the adhesive to pointed cone. The chute then raises the pointed cone has its horizontal axis substantially perpendicular the sheet of paper.

Like the flat based cone, the pointed cone is raised so that a cone centering arm further guides the pointed cone to center on the paper. Again the corrugation and the centering and the positioning provides for efficient wrapping.

This adhesive applicator is preferably a wheel. As the rotating wheel efficiently applies a spot of corn syrup or other edible adhesive at or near the base of the cone, while each cone is so conveyed, each cone may then be fed to the paper supply assembly. Just prior to reaching the paper supply assembly, each cone is elevated by adjustment in the rail system, so that the horizontal axis of each cone is substantially perpendicular to a sheet of paper.

As the cones are removed from the packaging, the paper is available to permit gripping of the cone. The paper prevents contact of the cones by a human hand and permits the consumer of the cone to avoid drips while at the same time providing a paper with which the hands may be cleaned after the cone is consumed. In this fashion a substantial advantage is obtained over the standard cone procedures.

The conveyor belt moving the cones to the adhesive applicator has a series of cross bars thereon. Each cross bar is contacts the top of the cone, and pushes the cone along the rails for the flat based cone or the chute for the pointed cone. The cross bars are in series and moved therealong by a conveyor belt. This structure permits the central axis of the cone to substantially coincide with the central axis of the package.

The spot of adhesive is of sufficient size to secure the paper to the cone, without causing one cone to adhere to the another adjacent cone. Preferably, the spot of adhesive has a diameter of up to 0.5 centimeter and a thickness of up to 0.5 centimeter. More preferably, the spot of adhesive has a diameter of up to 0.4 centimeter and a thickness of up to 0.4 centimeter. Most preferably, the spot of adhesive has a diameter of about 01. to about 0.3 centimeter and a thickness of about 01. to about 0.3 centimeter.

It also suitable at times to have a cone centering device to center the cone on the paper after the adhesive has been applied to the cone. By such additional positioning, the paper may be more efficient.

Referring now to FIG. 1, a cone stacking apparatus 100 receives a cone supply 104 of prepared cones suitable for holding ice cream or other food (not shown). Cone stacking apparatus 100 includes a conveyor belt 130. Conveyor belt 130 causes cone supply 104 to pass an adhesive dispenser 154. At that point the adhesive dispenser 154 places an edible adhesive spot 114 (FIG. 4) on each cone.

Conveyor belt 130 has a supply chute 140 mounted adjacent to the cone feed end 138 at one end thereof. Cone feed end 138 is oppositely disposed from paper assembly 180. Supply chute 140 has a supply of unwrapped cones 106 or 108 slidably positioned therein. A reciprocating suction cup 142 helps put each of cone 106 or 108 on conveyor belt 130.

Then each cone of cone supply 104 passes to a photoelectric eye 120. The photoelectric eye 120 coordinates the conveyor belt 130 with paper assembly 180. Simultaneously with the conveyor belt 130 and the adhesive dispenser 154, paper assembly 180 and the motor driven paper cam 182 are activated by photoelectric eye 120. As a cone contacts the cone centering device 124, the paper assembly 180 is activated so that a cone gets to the paper assembly 180 at the right time.

Figure 2:
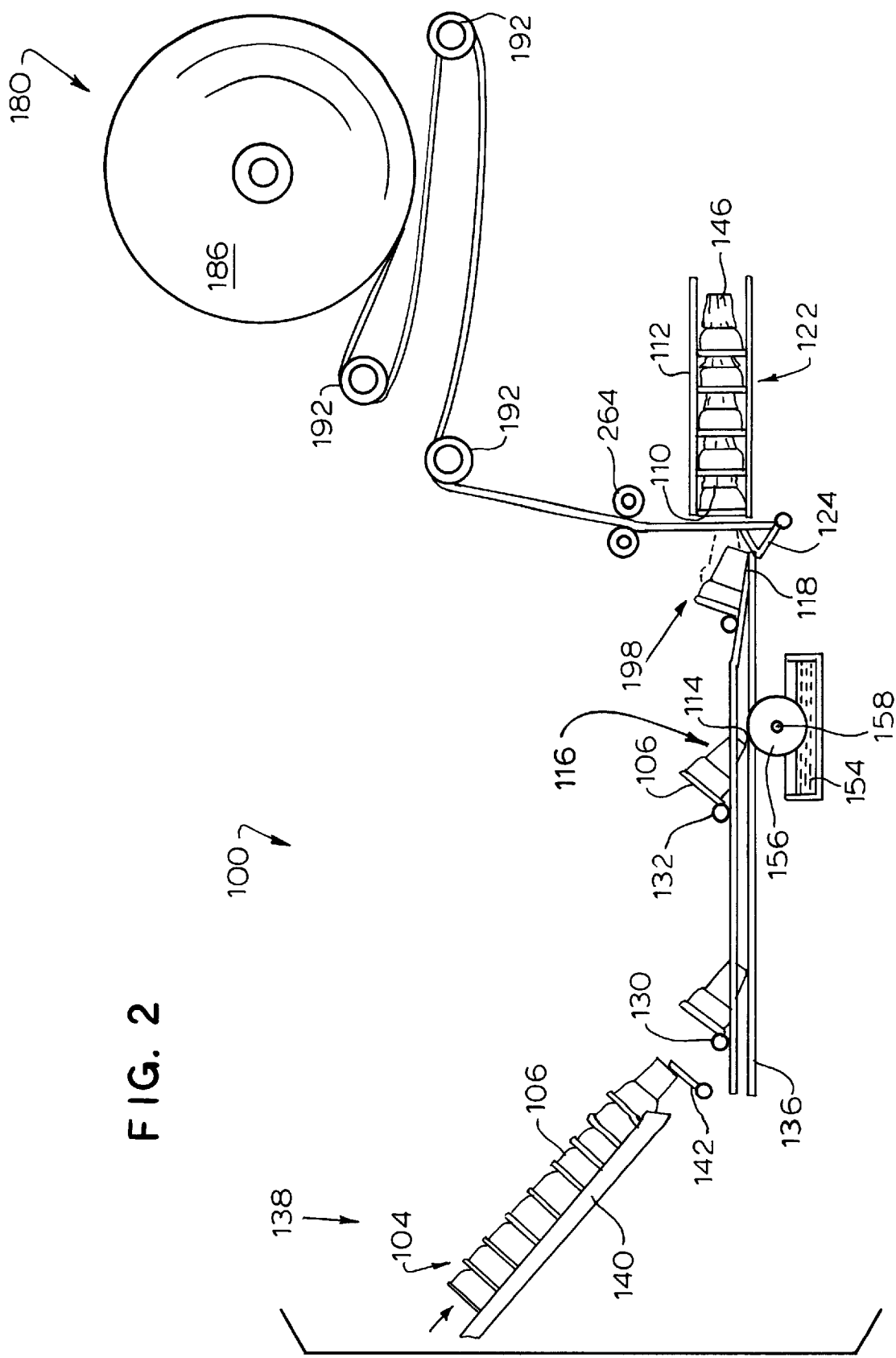
FIG. 2 depicts a side view of the cone stacking apparatus 100 of this invention used with a series of the flat based cone 106.

Referring now to FIG. 2 and FIG. 3, a series of the flat based cone 106 suitable for holding ice cream or other food (not shown) are provided to cone stacking apparatus 100. Cone stacking apparatus 100 includes the conveyor belt 130. The flat based cone 106 is laying on its side on conveyor belt 130.

The conveyor belt 130 includes a plurality of pushing bars 132. Each bar 132 contacts cone 106 or 108 (FIG. 11) at the top thereof and causes the cone 106 to pass an adhesive dispenser 154. At that point, the adhesive dispenser 154 places an edible adhesive spot 114 on the base edge 136 of flat based cone 106, while cone 106 is at adhesive angle 116. Situated above the conveyor belt 130 at the conveyor end 134 is the paper assembly 180.

As subsequent cones with paper sheet or wrap 146 adhered thereto are pushed into container 112, the nesting capability of the flat based cone 106 forces the paper sheet or wrap 146 therearound. The edible adhesive spot 114 holds the paper sheet or wrap 146 on the flat based cone 106 in the proper fashion.

As the flat based cone 106 is moved in an upward direction toward the paper sheet or wrap 146, the paper sheet or wrap 146 adheres to the flat based cone 106 at adhesive spot 114 and is pushed into the container 112. With repeat of this procedure, a flat cone stack 122 of flat based cone 106 is formed with the paper sheet or wrap 146 adhered thereto and wrapped therearound.

As the flat based cone 106 comes out of the packaging container 112 contact with a hand is made substantially only with the paper sheet or wrap 146. As the flat based cone 106 is filled by the server (not shown), contact with the flat based cone 106 in minimized. The consumer (not shown) of the flat based cone 106 may remove the paper sheet or wrap 146 as the flat based cone 106 is consumed.

The paper sheet or wrap 146 may also serve, both as a hand wipe after the flat based cone 106 and contents thereof are consumed and a device for preventing drips from the flat based cone 106 down to the hands of the person. The paper sheet or wrap 146 may also conserve and reduce waste of a flat based cone 106, because a flat based cone 106 with minor cracks is still useable due to the protection provided by the paper sheet or wrap 146. Accordingly, this apparatus 100, by applying the paper sheet or wrap 146 increases the utility and reduces the waste of the flat based cone 106.

It may be seen how the paper sheet or wrap 146 goes around the sides of the flat based cone 106. The adhesive spot 114 holds the paper sheet or wrap 146 in position as the stack 122 is formed. The forming of the stack 122 forces the paper sheet or wrap 146 to wrap around the flat based cone 106.

Referring now to FIG. 4 and FIG. 5, adhesive angle 116 for flat based cone 106 is depicted. Adhesive angle 116 is the efficient angle for the application of adhesive spot 114. Rail assembly 148 creates adhesive angle 116. The angle and spacing of the upper pair of rails 150 combined with the lower rails 152 provide this desired position, as determined empirically.

The cones are moved to the paper assembly 180 as the conveyor belt 130 cooperates with the rail assembly 148. Conveyor belt 130 is driven by a conveyor chain 194. Mounted on the conveyor belt 130 are a series of pushing bars 132, driven by the conveyor chain 194, which permits the cone such as flat cone 106 to be pushed along the conveyor rail assembly 148.

The top view shown in FIG. 4 of coating the flat bottom cones 106 depicts the adhesive dispenser 154, such as a holding vessel, which may hold corn syrup or a similar edible adhesive. An applicator wheel 156 and the wheel rod 158 that rotates the applicator wheel 156 removes the adhesive from the adhesive dispenser 154. The wheel rod 158 is driven in a standard fashion that moves the applicator wheel 156 through the adhesive dispenser 154, thereby applying adhesive to the cone 106 or 108. Adhesive dispenser 154 may be a simple pot.

The flat base based cone 106 moves along the rail assembly 148 by the conveyor chain 194 driven pushing bars 132. As the cone moves along rail assembly 148, it creates adhesive angle 116. The angle and spacing of the upper pair of rails 150 combined with the lower rails 152 cause the paper angle 118, because the upper pair of rails 150 spread out after the glue application and permit the cone to be angled upwardly so that the paper may be applied thereto.

With FIG. 6 and FIG. 7, paper angle 118 is depicted. Paper angle 118 is less than adhesive angle 116, assuming a horizontal basis. Both adhesive angle 116 and paper angle 118 are preferably measured from the horizontal. The paper angle 118 permits the centering of cone 106 for paper application by cone centering device 124.

Figure 8:
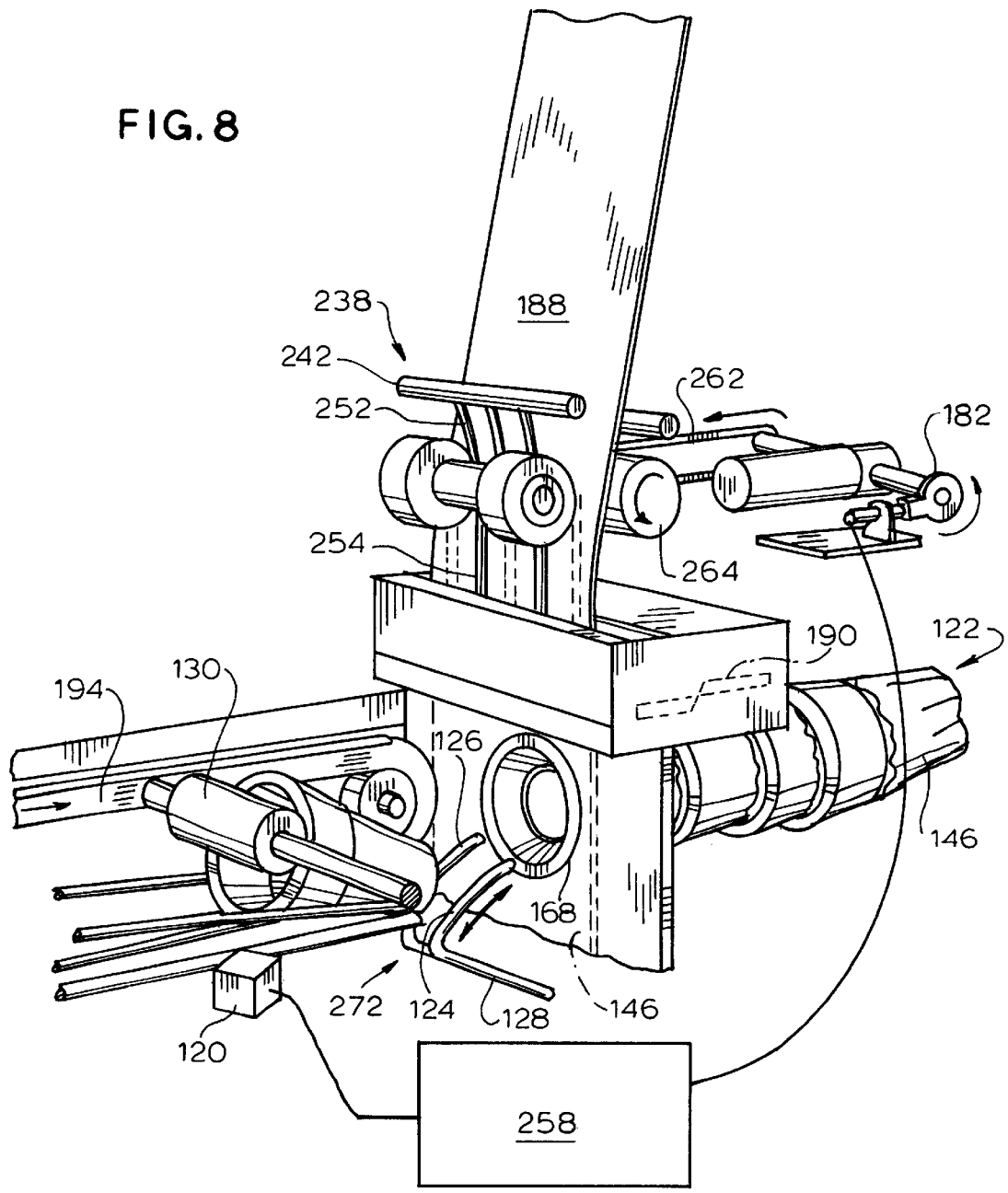
FIG. 8 depicts a perspective view of the flat based cone 106 approaching paper assembly 180.
Figure 9:
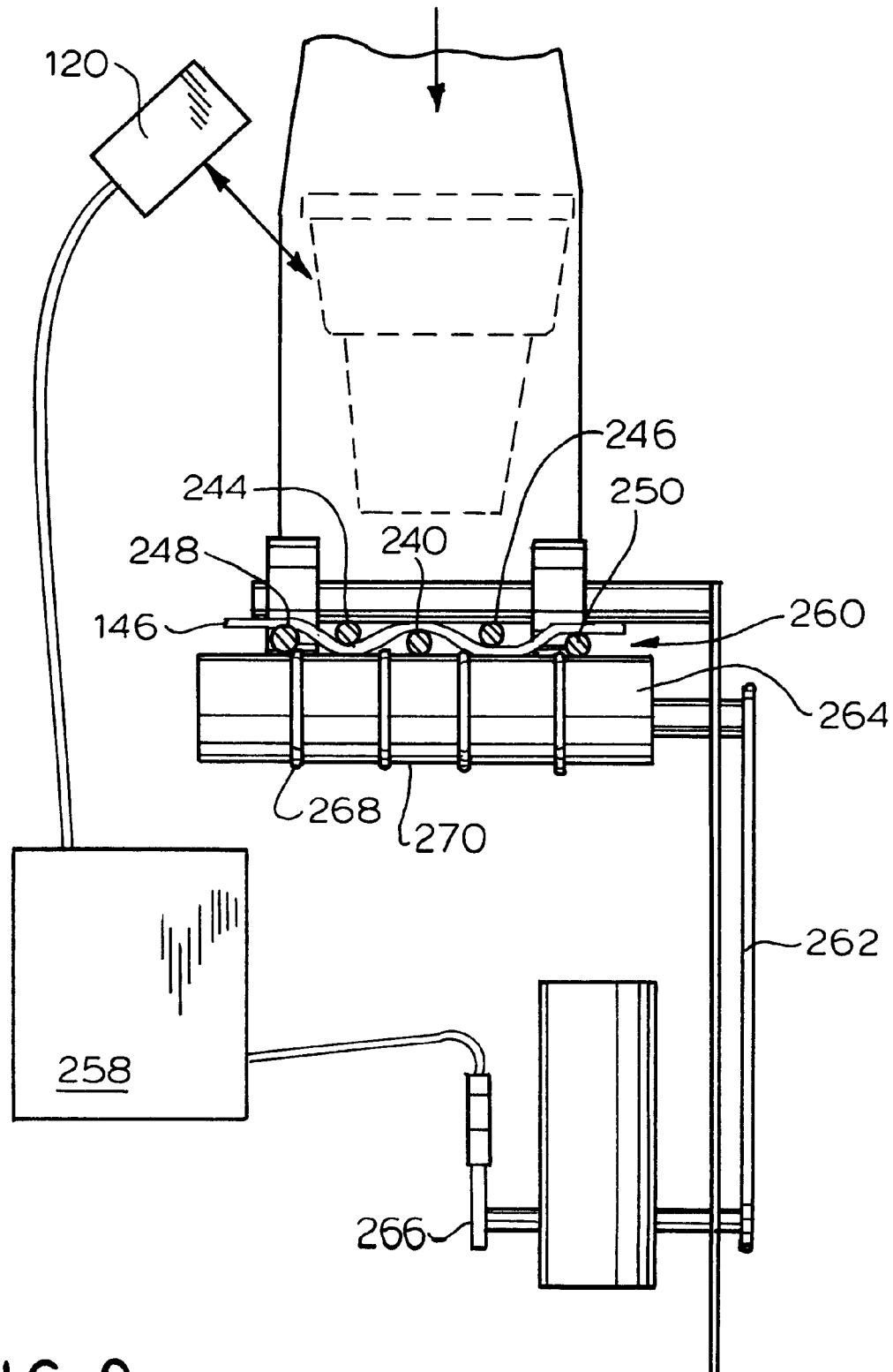
FIG. 9 depicts a top plan view of FIG. 8 showing the cone stacking apparatus 100 of this invention used with a series of the pointed cone 108.

Referring now to FIG. 8 and FIG. 9, the paper assembly 180 provides a paper wrap 146 to the cone feed 198. Paper assembly 180 includes a paper roll or paper supply 186 feeding paper 188 to a cutter 190. As the paper supply 186 is fed to the cutter 190, paper 188 weaves around a rod assembly 238.

Between the paper supply 186 and the cutter 190 are a series of reversing rolls 192 (FIG. 2), preferably three in number. Reversing rolls 192 cooperate with rod assembly 238 to permit the use of very thin paper for the cone wrap 146.

The paper cutter 190 then cuts the paper or cone wrap 146 from paper roll or supply 186. Then paper cutter 190 feeds a cone or paper wrap 146 to a cone aperture mount 168 of sufficient size to permit the flat based cone 106 to pass therethrough. As the flat based cone 106 passes through the cone aperture mount 168, the paper wrap 146 adheres to the adhesive spot 114 and proceeds into the container 112.

Rod assembly 238 includes a central rod 240 having a central end 242 adjacent to the paper 188. On either side of central rod 240, are first interior rod 244 and second interior rod 246. First outside rod 248 is adjacent to first interior rod 244 and oppositely disposed from central rod 240. Second outside rod 250 is adjacent to second interior rod 246 and oppositely disposed from central rod 240. Thus, the sequential numbers for the rods of rod assembly 238 are first outside rod 248, first interior rod 244, central rod 240, second interior rod 246 and second outside rod 250.

First interior rod 244 and second interior rod 246 each have first coplanar ends 252 adjacent to the paper 188. First outside rod 248, central rod 240 and second outside rod 250 have second coplanar ends 254 adjacent to the paper 188. First coplanar ends 252 are not coplanar with second coplanar ends 254.

Oppositely disposed from first coplanar ends 252 and second coplanar ends 254 are lower rod ends 260 for each of central rod 240, first interior rod 244, second interior rod 246, first outside rod 248 and second outside rod 250. All of lower rod ends 260 are coplanar and oppositely disposed from first coplanar ends 252 and second coplanar ends 254.

First interior rod 244 and second interior rod 246 combine to form an arcuate plane from first coplanar ends 252 to rod ends 260. First outside rod 248, central rod 240 and second outside rod 250 combine to form an arcuate plane from second coplanar ends 254 to lower rod ends 260.

Such a variation from non-coplanar to coplanar permits paper 188 to enter rod assembly 238 with first interior rod 244 and second interior rod 246 on one side thereof; and first outside rod 248, central rod 240 and second outside rod 250 on the other side of paper 188. As paper 188 passes through rod assembly 238, it becomes corrugated. Then paper wrap 146, as corrugated, is more easily applied to each cone of cone supply 104 as it passes at the cone feed 198, and is formed into a cone stack 122 (FIG. 2) to be placed in packaging container 112 (FIG. 1).

After the adhesive spot 114 is applied, between the conveyor belt 130 and the paper wrap 146, may be a cone centering device 124. Cone centering device 124 is secured by centering arm 128 adjacent conveyor end 134. Centering arm 128 has a cone arc sleeve 126 positioned to center the cone 106 on the paper wrap 146. Paper wrap 146 is then applied to the base and side of the flat based cone 106 as a first cone 106 is nested into second cone 106 and placed in package 110.

In FIG. 8, the cone 106 flows from the rail assembly 148 to a centering arc. A photoelectric eye 120 senses the position of the cone and passes this information to a control box 258 which in turn sends the information to a chain belt drive 262. The chain belt drive 262 activates paper rollers 264 at a motor driven paper cam 182 to move the paper wrap 146 to an appropriate position to be cut and assembled. The rollers 264 have rubber rings 268 on the rim 270 to contact the paper wrap 146. As the paper wrap 146 is corrugated, the paper is cut and then dropped into position so that the cone is forced from the centering arm 128 through the centering device 272 to the paper as the cones are stacked.

The centering device 272 takes the cone off the rails and positions it properly to be put in the paper. The photoelectric eye 120 signals the position and determines the position and when to activate the appropriate motor.

In FIG. 9, the corrugation permits the air to flow around the paper wrap 146 and avoid static features. The rubber rings 268 mounted on the roller move the paper down in position between the corrugating members. In this fashion, the cone can be efficiently coated with paper.

Figure 10:
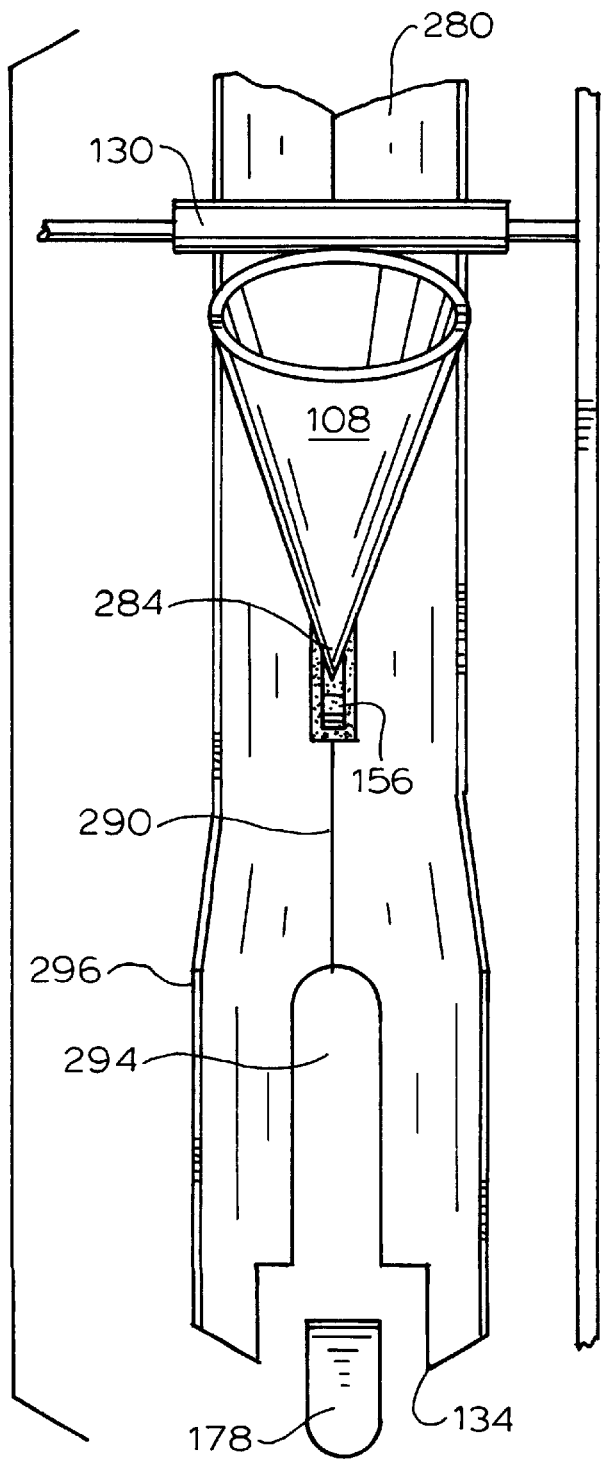
FIG. 10 depicts an top plan view of chute 280 in use with pointed cone 108.
Figure 11:
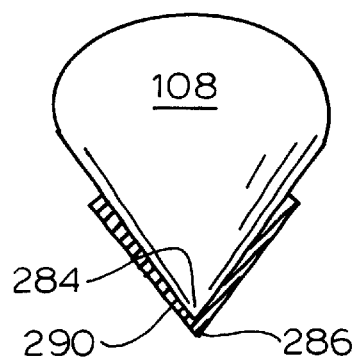
FIG. 11 depicts an end plan view in partial cross-section of the pointed cone 108 supported in narrow chute 290, narrow chute 290 being shown in partial cross-section.
Figure 12:
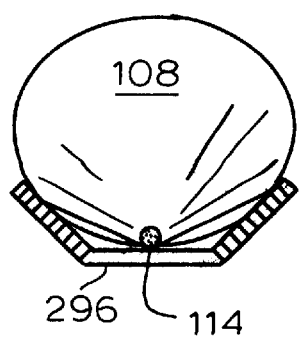
FIG. 12 depicts an end plan view of the pointed cone 108 supported in wider chute section 296, wider chute section 296 being shown in partial cross-section.

In FIG. 10, FIG. 11 and FIG. 12, for the pointed cone 108, the rail assembly is replaced with a chute 280. In the chute 280 adjacent to the cone feed, the chute 280 is angled so that the cone tip 284 covers the bottom 286 of chute 280 in narrow chute portion 290. At a certain point, the pointed cone 108 reaches the glue wheel or applicator wheel 156 and has a spot of edible glue 114 applied adjacent to the tip 284 of the pointed cone 108, through chute slot 294.

The pointed cone 108 then passes over the glue wheel or applicator wheel 156 and is permitted to pass into a wider chute section 296. This wider chute section 296 angles the pointed cone 108 upwardly to achieve the paper angle 118 and contact the centering device 178 for appropriate attachment of the paper 188.

At the applicator wheel 156, is an adjustment for wider chute section 296 which effectively raises the pointed cone after the glue 114 is applied and permits only that part of the cone 108 to have the glue 114 applied thereto. This particular spotting and setting of the glue 114 provides a great advantage and prevents the cones 108 from sticking together.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

I claim:

1. A cone assembly suitable for containing a food comprising:

(a) the cone assembly including an edible hollow cone, a spot of adhesive on the cone, and a corrugated wrap;

(b) the edible hollow cone being adapted to receive a food;

(c) the edible hollow cone having an open end for receiving the food and a closed end for holding the food in the edible hollow cone, with a cone side between the open end and the closed end;

(d) the spot of adhesive being on the edible hollow cone adjacent to the closed end;

(e) the corrugated wrap being adhered to the spot of adhesive, and covering the closed end and at least part of the side;

(f) the cone assembly being removably stackable with at least one other cone assembly;

(g) the spot of adhesive being positioned at an area of the edible cone;

(h) the area of the edible cone being selected from the group consisting of at the base of the edible cone and adjacent to the base of the edible cone; and (i) the corrugated wrap being paper up to 0.023 millimeter thick.

2. An apparatus for stacking at least a first cone assembly suitable for containing a food with a second cone assembly, the first cone assembly being substantially identical to second cone assembly; the apparatus including, in cooperation, a cone supply means, a conveying means, an adhesive application means, a paper supply assembly, and a stacking means; and further comprising:

(a) the paper supply assembly including a roll assembly, a corrugating assembly, and a cutting assembly;

(b) the roll assembly cooperating with the corrugating assembly and the cutting assembly in order to provide a paper wrap to form the first cone assembly and the second cone assembly;

(c) the roll assembly providing a cuttable paper to form the paper wrap;

(d) the corrugating assembly receiving the cuttable paper in order to form a wrinkle pattern in the paper;

(e) the cutting assembly severing the cuttable paper to form the paper wrap; and (f) the corrugating assembly and the cutting assembly being adapted to cooperate with the conveying means to apply the paper wrap to the first cone and the second cone.

3. The apparatus of claim 2 further comprising:

(a) the roll assembly including one to five reversing rollers adapted to reverse a direction of the cuttable paper and provide flexibility in the forming of the paper wrap;

(b) the wrinkle pattern being adapted to assist the forming of the paper wrap; and (c) the paper wrap being provided substantially perpendicularly to a horizontal axis of the first cone and the second cone.

4. The apparatus of claim 2 further comprising:

(a) the conveying assembly including an adhesive angling means, a wrap positioning means and a centering means;

(b) a pushing means being adapted to move the first cone along the conveying assembly from the adhesive angling means to the wrap positioning means and then to the centering means;

(c) the centering means being adapted to center the first cone and the second cone at the paper wrapping; and (d) a cone feeding device cooperating with the conveying means.

5. The apparatus of claim 2 further comprising:

(a) the adhesive application means including a tank cooperating with a wheel applicator;

(b) the wheel applicator being adapted to contact the first cone at an area of the first cone;

(c) the area of the first cone being selected from the group consisting of at the base of the edible cone and adjacent to the base of the edible cone; and (d) the cone feeding device being a chute.

6. The apparatus of claim 5 further comprising:

(a) the chute including a chute support means; and (b) a cone removal means cooperating with the chute in order to provide the first cone to the conveying means.

7. The apparatus of claim 6 further comprising:

(a) the adhesive angling means including a rail system in order to convey the first cone as a flat based cone;

(b) the flat based cone having a corner at a flat base of the flat based cone; and (c) the adhesive application means being adapted to apply a spot of edible adhesive at the corner.

8. The apparatus of claim 7 further comprising:

(a) the rail system including upper pair of rails and a lower pair of rails;

(b) the lower pair of rails being adapted to position the flat based cone for a first contact with the wheel applicator, and a second contact with the wrap positioning means and a third contact with the centering means; and (c) the centering means assisting the paper supply assembly and the stacking means with the stacking of the cone assembly.

9. The apparatus of claim 6 further comprising:

(a) the conveying means including a slotted chute in order to convey the first cone as a pointed cone having a conical point one end thereof oppositely disposed from the open end;

(b) the slotted chute including a wheel receiving slot to receive the adhesive wheel;

(c) the adhesive wheel being adapted to contact the pointed cone through the wheel receiving slot;

(d) the adhesive wheel being adapted to contact the pointed cone at an area of the pointed cone; and (e) the area of the pointed cone being selected from the group consisting of at the base of the pointed cone and adjacent to the base of the pointed cone.

10. The apparatus of claim 6 further comprising:

(a) a series of cross bars moving at least one cone along the conveyor means to the adhesive applicator;

(b) each member of the series of cross bars contacting the open end of the cone; and (c) each member of the series of cross bars pushing the cone along the conveying means.

11. The apparatus of claim 6 further comprising:
(a) a photoelectric eye coordinating the cone supply means, the conveying means, the adhesive application means, the paper supply assembly, and the stacking means in order to provide for efficient stacking of at least a first cone assembly and a second cone assembly; and
(b) the paper supply assembly including a paper roll for feeding paper to a cutter;
(c) a rod assembly being mounted between the paper roll and the cutter;
(d) the rod assembly serving to corrugate the paper in order to wrap the edible cone efficiently.

12. The apparatus of claim 11 further comprising:
(a) the rod assembly including a central rod, a first interior rod, a second interior rod, a first outside rod and a second outside rod;
(b) the first outside rod being adjacent to the first interior rod and oppositely disposed from the central rod;
(c) the second outside rod being adjacent to the second interior rod and oppositely disposed from the central rod;
(d) the first interior rod and the second interior rod each having first coplanar ends adjacent to the paper;
(e) the first outside rod, the central rod and the second outside rod having second coplanar ends adjacent to the paper;
(f) the first coplanar ends being non coplanar with second coplanar ends;
(g) the first coplanar ends and the second coplanar ends having lower rod ends oppositely disposed therefrom on each of the central rod, the first interior rod, the second interior rod, the first outside rod and the second outside rod; and
(h) the lower rod ends being all coplanar.

13. An apparatus for stacking at least a first cone assembly suitable for containing a food with a second cone assembly, the first cone assembly being substantially identical to second cone assembly; the apparatus including, in cooperation, a cone supply means, a conveying means, an adhesive application means, a paper supply assembly, and a stacking means; and further comprising:
(a) the paper supply assembly including a roll assembly, a corrugating assembly, and a cutting assembly;
(b) the roll assembly cooperating with the corrugating assembly and the cutting assembly in order to provide a paper wrap to form the first cone assembly and the second cone assembly;
(c) the roll assembly providing a cuttable paper to form the paper wrap;
(d) the corrugating assembly receiving the cuttable paper in order to form a wrinkle pattern in the paper;
(e) the cutting assembly severing the cuttable paper to form the paper wrap;
(f) the corrugating assembly and the cutting assembly being adapted to cooperate with the conveying means to apply the paper wrap to the first cone and the second cone;
(g) the roll assembly including one to five reversing rollers adapted to reverse a direction of the cuttable paper and provide flexibility in the forming of the paper wrap;
(h) the wrinkle pattern being adapted to assist the forming of the paper wrap;
(i) the paper wrap being provided substantially perpendicularly to a horizontal axis of the first cone and the second cone;
(j) the conveying assembly including an adhesive angling means, a wrap positioning means and a centering means;
(k) a pushing means being adapted to move the first cone along the conveying assembly from the adhesive angling means to the wrap positioning means and then to the centering means;
(l) the centering means being adapted to center the first cone and the second cone at the paper wrapping; and
(m) a cone feeding device cooperating with the conveying means.

14. The apparatus of claim 13 further comprising:
(a) the adhesive application means including a tank cooperating with a wheel applicator;
(b) the wheel applicator being adapted to contact the first cone at an area of the first cone;
(c) the area of the first cone being selected from the group consisting of at the base of the edible cone and adjacent to the base of the edible cone; and
(d) the cone feeding device being a chute.

15. The apparatus of claim 14 further comprising:
(a) the chute including a chute support means; and
(b) a cone removal means cooperating with the chute in order to provide the first cone to the conveying means.

16. The apparatus of claim 14 further comprising:
(a) the conveying means including a rail system in order to convey the first cone as a flat based cone;
(b) the flat based cone having a corner at a flat base of the flat based cone;
(c) the adhesive application means being adapted to apply a spot of edible adhesive at the corner;
(d) the rail system including upper pair of rails and a lower pair of rails;
(e) the lower pair of rails being adapted to position the flat based cone for a first contact with the wheel applicator, and a second contact with the wrap positioning means and a third contact with the centering means; and
(f) the centering means assisting the paper supply assembly and the stacking means with the stacking of the cone assembly.

17. The apparatus of claim 13 further comprising:
(a) the conveying means including a slotted chute in order to convey the first cone as a pointed cone having a conical point one end thereof oppositely disposed from the open end;
(b) the slotted chute including a wheel receiving slot to receive the adhesive wheel;
(c) the adhesive wheel being adapted to contact the pointed cone through the wheel receiving slot;
(d) the adhesive wheel being adapted to contact the pointed cone at an area of the pointed cone; and
(e) the area of the pointed cone being selected from the group consisting of at the base of the pointed cone and adjacent to the base of the pointed cone.

18. The apparatus of claim 17 further comprising:
(a) a series of cross bars moving at least one cone along the conveyor means to the adhesive applicator;
(b) each member of the series of cross bars contacting the open end of the cone;
(c) each member of the series of cross bars pushing the cone along the conveying means;

(d) a photoelectric eye coordinating the cone supply means, the conveying means, the adhesive application means, the paper supply assembly, and the stacking means in order to provide for efficient stacking of at least a first cone assembly and a second cone assembly;

(e) the paper supply assembly including a paper roll for feeding paper to a cutter;

(f) a rod assembly being mounted between the paper roll and the cutter; and (g) the rod assembly serving to corrugate the paper in order to wrap the edible cone efficiently.

19. The apparatus of claim 18 further comprising:

(a) the rod assembly including a central rod, a first interior rod, a second interior rod, a first outside rod and a second outside rod;

(b) the first outside rod being adjacent to the first interior rod and oppositely disposed from the central rod;

(c) the second outside rod being adjacent to the second interior rod and oppositely disposed from the central rod;

(d) the first interior rod and the second interior rod each having first coplanar ends adjacent to the paper;

(e) the first outside rod, the central rod and the second outside rod having second coplanar ends adjacent to the paper;

(f) the first coplanar ends being non coplanar with second coplanar ends;

(g) the first coplanar ends and the second coplanar ends having lower rod ends oppositely disposed therefrom on each of the central rod, the first interior rod, the second interior rod, the first outside rod and the second outside rod; and (h) the lower rod ends being all coplanar.

* * * * *